3,051,692
PRODUCTION OF SOLID OLEFIN POLYMERS
Harold D. Lyons, Orange, Tex., assignor to Phillips Petroleum Company, a corporation of Delaware
No Drawing. Filed June 6, 1960, Ser. No. 33,945
11 Claims. (Cl. 260—93.7)

This invention relates to the production of solid olefin polymers. In one aspect, the invention relates to an improved process for preparing from certain selected olefins solid polymers having a high isotactic content.

Various reactions for polymerizing olefins as described in the literature, and the polymerizations are usually carried out in the presence of catalysts. One type of catalyst which has recently been disclosed for use in the polymerization of monoolefins, particularly ethylene, consists of an organometal compound, e.g., triethylaluminum, and a compound of a heavy metal, e.g., titanium tetrachloride. It has been found that when certain olefins, e.g., propylene, are contacted with such a catalyst, a polymer is obtained which is crystalline and which is characterized by certain regularity of molecular structure. Thus, a polypropylene molecule can be considered as a chain of 2-carbon units with a methyl side group attached to every other carbon atom in the chain. Certain polymers of this type are characterized by the fact that they contain a series of such monomer units in which all of the methyl side groups are oriented in space at the same position or at the same angle with respect to the respective tertiary carbon atoms to which they are attached. The portion of polymer having this regular structure is highly crystalline and is generally referred to as isotactic polypropylene. The amount of isotactic polypropylene contained in the total polymer product formed in any given polymerization appears to have a significant influence on certain properties of the polymer product, such as hardness, modulus, ultimate tensile strength, range of melting temperatures, and molding and fiber-forming properties. The higher the isotactic content of the polymer, the more outstanding are the physical properties of that polymer.

It is an object of this invention, therefore, to provide an improved process for producing isotactic polymers.

Another object of the invention is to provide a process for preparing polymers having isotactic contents which are higher than those of conventionally prepared polymers.

A further object of the invention is to provide a process in which increased yields of isotactic polymers are obtained.

Other and further objects and advantages of the invention will become apparent to those skilled in the art upon consideration of the accompanying disclosure.

The present invention resides in the discovery of a catalyst system which, when used in the polymerization of certain olefins, produces a polymer of high isotactic content. Broadly speaking, the process of this invention comprises the step of contacting an olefin corresponding to the formula R—CH=CH$_2$, wherein R is an alkyl radical containing from 1 to 4 carbon atoms or a phenyl or alkyl-substituted phenyl radical, with a catalyst comprising (a) an organometal, (b) a tetrachloride of a group IV metal, (c) an organophosphorus compound, and (d) an alkali metal aryl. When proceeding in accordance with the present invention, it has been found that polymers having isotactic contents in the range of 70 to 80 and higher can be readily prepared. In comparison, if the polymerization is conducted in the presence of a catalyst consisting of a trialkylaluminum and a tetrachloride of a group IV metal, e.g., triethylaluminum and titanium tetrachloride, a polymer having an isotactic content between 15 and 30 percent is generally obtained. It is thus seen that the addition of certain materials, i.e., an organophosphorus-containing compound and an alkali metal aryl, to catalyst systems which normally produce polymers of very low isotactic contents results in a substantial increase in the isotactic content of the product produced. Furthermore, it has been found that both of the aforementioned materials must be included in the catalyst system in order to obtain the desired increase in the isotactic content of the polymer. The reason for the unexpected improvement obtained when utilizing the catalyst system of this invention to polymerize certain olefins is not completely understood. However, it is apparent that the organophosphorus-containing compound and the alkali metal aryl act to modify the action of the known catalyst ingredients, i.e., the organometal and the Group IV metal tetrachloride, so that the polymer product is one having a high isotactic content.

The olefins which are polymerized in accordance with the present invention correspond to the formula R—CH=CH$_2$, wherein R is selected from the group consisting of an alkyl radical containing from 1 to 4, inclusive, carbon atoms, a phenyl radical and an alkyl-substituted phenyl radical. The total number of carbon atoms in the alkyl groups substituted on the phenyl radical preferably does not exceed 6 carbon atoms. Examples of suitable olefins include propylene, 1-butene, 1-pentene, 2-methyl-1-butene, 2-methyl-1-pentene, 4-methyl-1-pentene, 3,3-dimethyl-1-butene, styrene, 2-methylstyrene, 4-methyl-styrene, 3-ethylstyrene, 3-ethyl-4-methylstyrene, 3,4-diethylstyrene, 2,4-di-n-propylstyrene, 2,4-diethylstyrene, and the like. It is often preferred to utilize propylene as the monomer.

The organometals used in the instant catalyst system are compounds having the formula $R'_xM$, wherein R' is selected from the group consisting of alkyl, cycloalkyl, aryl, alkaryl, and an aralkyl, M is a metal selected from the group consisting of aluminum, gallium, indium and thallium, and $x$ is an integer equal to the valence of the metal M. It is usually preferred that the R' radical contain not more than 12 carbon atoms. Examples of suitable organometals include trimethylaluminum, triethylaluminum, triisobutylaluminum, trioctylaluminum, tridodecylaluminum, triphenylaluminum, tricyclohexylaluminum and the like as well as analogous compounds of gallium, indium and thallium. It is usually preferred to utilize a trialkylaluminum in the catalyst system.

The tetrachlorides of titanium, zirconium and hafnium can be used in the instant catalyst system. It is usually preferred to use titanium tetrachloride as the component of the catalyst system.

The organophosphorus-containing compounds employed in the catalyst correspond to the general formula R''$_3$P, wherein R'' is selected from the group consisting of alkyl, cycloalkyl, aryl, alkaryl and aralkyl. Each of the aforementioned hydrocarbon radicals may contain up to about 20 carbon atoms, preferably from 1 to 10, inclusive, carbon atoms. Mixtures of any two or more of these phosphorus-containing compounds can be employed in the practice of the invention. Examples of compounds which can be used include triphenylphosphine, trimethylphosphine, triisopropylphosphine, tri-tert-butylphosphine, tri-tert-dodecylphosphine, trieicosylphosphine, tri-p-olylphosphine, tricyclohexylphosphine, and the like.

The alkali metal aryls used as components in the present catalyst system correspond to the general formula R'''M', wherein R''' is an aryl radical and M' is a metal selected from the group consisting of lithium, sodium, potassium, rubidium and cesium. Examples of suitable alkali metal aryls include phenylsodium, naphthylsodium, 4-methylphenylsodium as well as analogous compounds of potassium, lithium, rubidium and cesium.

Examples of catalyst systems which can be advantageously used in the pratcice of the invention include the following: triisobutylaluminum, titanium tetrachloride, triphenylphosphine and phenylsodium; triethylaluminum, titanium tetrachloride, triphenylphosphine and phenyllithium; zirconium tetrachloride, triethylaluminum, tributylphosphine and phenyllithium; triethylgallium, hafnium tetrachloride, triisopropylphosphine and naphthylpotassium; and triethylaluminum, titanium tetrachloride, trimethylphosphine and naphthylsodium.

The amount of the total catalyst composition used in the process of this invention can vary over a rather wide range. However, the amount of the catalyst is usually in the range of 0.05 to 1.0 and higher weight percent, based on the olefin feed. The ratio of the individual catalyst components employed in the catalyst system can also be varied rather widely, depending upon the particular monomer used and operating conditions. The ratio of the catalyst components is generally in the range of 0.2 to 3 moles of the organophosphorus-containing compound to 1 mole of the group IV metal tetrachloride to 0.2 to 3.0 moles of the organometal. The alkali metal aryl is usually present in the ratio of 1.5 to 4 moles per mole of the group IV metal tetrachloride although lesser and greater amounts can be used if desired.

The process of this invention is usually carried out in the presence of a hydrocarbon diluent which is relatively inert and liquid under conditions of the process and does not have a deleterious effect on the catalyst. Suitable diluents include paraffinic, cycloparaffinic and/or aromatic hydrocarbons. Examples of such diluents include propane, butane, pentane, hexane, cyclohexane, methylcyclohexane, benzene, toluene, the xylenes and like. The relative amounts of diluent and olefin employed in the polymerization depend upon the particular conditions and techniques used ande are generally governed by the capacity of the apparatus to affect suitable agitation and heat removal. In general, the total olefin content of the feed mixture charged to the polymerization reactor is in the range of 0.5 to 25 weight percent of the diluent present in the reactor.

The polymerization can be carried out at a temperature varying over the rather broad range, for example, at a temperature from 100 to 500° F. However, it is usually preferred to conduct the polymerization at a temperature in the range of 150 to 350° F. Pressure employed in the process can range from atmospheric and below to about 30,000 p.s.i.g. and higher, with a preferred range being between 50 and 1500 p.s.i.g. In general, pressures are satisfactory which are sufficient to maintain the reaction mixtures substantially in the liquid phase.

It has been found that various materials in some instances may have a tendency to inactivate the catalyst composition of this invention. These materials include carbon dioxide, oxygen and water. Accordingly, it is usually desirable to free the olefins to be polymerized from these materials as well as from other materials which may tend to inactivate the catalyst before contacting the olefin with the catalyst. Any of the known means for removing such contaminants can be employed. Furthermore, the hydrocarbon diluent employed in the process is preferably freed of contaminants, such as water, oxygen and the like. It is desirable also that air and moisture be removed from the reaction vessel before the reaction is carried out. This is usually accomplished by purging with an inert gas such as nitrogen. In some cases, small amounts of catalyst-inactivating mateirals, such as oxygen and water, can be tolerated in the reaction mixture while obtaining reasonably good polymerization rates. However, it is to be understood that the amount of such materials present in the reaction mixture shall not be sufficient to completely inactivate the catalyst.

The process of this invention can be carried out as a batch process by pressurizing the olefin to be polymerized into a reactor containing the catalyst and the diluent. In one method of operation, the group IV metal tetrachloride and the organophosphorus-containing compound are heated together after which the alkali metal aryl is added to the heated materials. After the resulting material is recovered and charged to a reactor containing diluent, the organometal is added, and the reactor is then closed. Before charging the olefin to be polymerized, it is usually desirable to purge the reactor with a portion of the monomer. The monomer is then vented after which the initial monomer charge is introduced, and the temperature is raised until polymerization is initiated. The temperature is then maintained in the desired range by heating or by cooling as is necessary. It is frequently found to be desirable to add the monomer in increments during polymerization, the amounts added being sufficient to maintain the pressure at a substantially constant level. While it is often preferred to operate in accordance with the aforementioned procedure, it is to be understood that it is not intended to limit the invention to any particular method of operation. Furthermore, the process can be carried out continuously by maintaining the above-described concentrations of reactants in the reactor for a suitable length of time. The residence time used in a continuous process can vary widely since it depends to a great exent upon the temperature at which the process is carried out and upon the specific olefin that is to be polymerized. However, the residence time in a continuous process generally falls within the range of 1 second to 5 hours or more. In a batch process, the reaction time can also vary widely, such as from 15 minutes up to 24 hours or more.

Upon completion of the polymerization, any excess olefin is vented, and the contents of the reactor are then treated by any suitable method to inactivate the catalyst and remove the catalyst residues. In one method, inactivation of the catalyst is accomplished by washing with an alcohol, water or other suitable materials. In some cases, the catalyst inactivating treatment also removes a major proportion of the catalyst residues while in other cases it may be necessary to treat the polymer with an acid, a base or other suitable material to effect the desired removal of the catalyst residues. The treatment of the polymer may be carried out in a comminution zone, such as a Waring Blendor, so that a finely divided polymer is thereby provided. The polymer is then separated from the diluent, e.g., by decantation, filtration or other suitable method, after which the polymer is dried. The diluent and treating agents can be separated by any suitable means, e.g., by fractional distillation, and reused in the process.

A more complete understanding of the invention can be obtained by referring to following illustrative example which is not intended, however, to be unduly limitative of the invention.

*Example*

Propylene was polymerized in a 1-gallon stainless steel reactor, employing a catalyst consisting of triisobutylaluminum, titanium tetrachloride, triphenylphosphine and phenylsodium. The procedure described hereinafter was followed in conducting this run which was carried out according to the present invention.

To a solution of 26.2 grams of triphenylphosphine in 100 ml. of benzene (dried over calcium hydrite), there was added a solution of 9.5 grams of titanium tetrachloride in 50 ml. of dry benzene. Addition of this solution was made dropwise over a period of about 5 minutes during which time the temperature rose from 27 to 37° C. A dark purple solid was formed in the flask, and the benzene was then removed by a distillation under a stream of nitrogen. A dark purple, porous cake was left in the vessel. This cake was transferred to a dry box, broken up, powdered, and placed in 2 dry containers. This powdered material in the amount of 16.23 grams, 10.0 grams of phenylsodium and 1500 ml. of dry cyclohexane were charged to the stainless steel reactor while flushing the system with nitrogen. The reactor was closed after which 10 grams (70.0 ml. of a cyclohexane solution) of triisobutylaluminum was charged to the reactor through a charging tube. The reactor was flushed twice with propylene at 100 p.s.i.g. One pound of propylene was then charged to the system after which the temperature was raised to 200° F. and maintained at a temperature in the range of 200 to 230° F. for a period of 7 hours. After cooling, the reactor contents were stirred with methanol in a Waring Blendor. The polymer was isolated on a filter and dried in a vacuum oven at 80° C. A yield of 87 grams of a propylene having an isotactic content (heptane insolubles) of 73.6 percent was obtained.

A control run was carried out in which propylene was polymerized in the presence of a catalyst consisting of triisobutylaluminum, titanium tetrachloride and triphenylphosphine. In this run, the procedure as described hereinabove was used in charging the reactant material. About 19.72 grams of the powdered material, obtained as described above by adding the diphenylphosphine and titanium tetrachloride to a flask and distilling the benzene, was charged to a 1-gallon stainless steel reactor containing 1500 ml. of dicyclohexane. The reactor was then closed after which 10 grams (70.0 ml. of a cyclohexane solution) of triisobutylaluminum was added to the reactor. The reactor was flushed twice with propylene at 100 p.s.i.g. before adding 1 pound of propylene. The temperature was raised to 200° F. and maintained in the range of 200 to 228° F. for a period of 7 hours. After cooling, the reactor contents were stirred with methanol in a Waring Blendor. The polymer was isolated on a filter and dried in a vacuum oven at 80° C. There was recovered 4.4 grams of polypropylene having an isotactic content (heptane insolubles) of 29 percent.

The isotactic content of the products was determined by placing a weighed amount of polymer in a weighed extraction thimble and extracting in an ASTM rubber extraction apparatus for 2.5 hours with 100 ml. of normal heptane. The thimble was then removed and dried in a forced air oven at 110° C. for 2 hours after which it was cooled in a dessicator and weighed. The weight percent of residue based on original polymer was calculated and recorded as the isotactic content of the polymer.

For a consideration of the foregoing runs, it is seen that in the run conducted in accordance with the present invention, a polypropylene was obtained which had a high isotactic content. The product from this run is to be compared with that of the control run which omitted one of the catalyst components of the present catalyst system. It is thus seen that the instant catalyst makes it possible to obtain a product having a high isotactic content. Utilization of the instant catalyst system also resulted in greatly improved yields of the polymer product.

The polymers produced in accordance with this invention have utility in applications where solid plastics are used. They can be molded to form articles of any desired shape such a bottles or any other type of containers. Furthermore, they can be formed into sheets, film or pipe by extrusion or other suitable methods.

It will be apparent to those skilled in the art that many variations and modifications of the invention can be practiced upon study of the foregoing disclosure. Such variations and modifications are believed to come within the spirit and scope of the invention.

I claim:

1. A process for polymerizing an olefin corresponding to the formula $R-CH=CH_2$, wherein R is selected from the group consisting of alkyl radicals containing from 1 to 4, inclusive, carbon atoms, a phenyl radical, and an alkyl-substituted phenyl radical, the total number of carbon atoms in said substituted alkyl groups being in the range of 1 to 6, inclusive, said process comprising the step of contacting said olefin with a catalyst comprising (a) an organoaluminum compound having the formula $R'_3Al$, wherein R' is selected from the group consisting of alkyl, cycloalkyl, aryl, alkaryl and aralkyl, (b) titanium tetrachloride, (c) an organophosphorus-containing compound corresponding to the formula $R''_3P$, wherein R'' is selected from the group consisting of alkyl, cycloalkyl, aryl, alkaryl and aralkyl and (d) a sodium aryl compound, the ratio of said catalyst components being in the range of 0.2 to 3 mols of (c) to 1 mol of (b) to 0.2 to 3.0 mols of (a) and 1.5 to 4 mols of (d) per mol of (b).

2. A process in accordance with claim 1 in which said olefin is propylene.

3. A method in accordance with claim 1 in which said catalyst consists essentially of a mixture of triisobutylaluminum, titanium tetrachloride, triphenylphosphine and phenylsodium.

4. A method according to claim 1 in which said catalyst consists essentially of a mixture of triethylaluminum, titanium tetrachloride, triphenylphosphine and phenylsodium.

5. A method according to claim 1 wherein said catalyst consists essentially of a mixture of triethylaluminum, titanium tetrachloride, trimethylphosphine and naphthylsodium.

6. A process for polymerizing an olefin corresponding to the formula $R-CH=CH_2$, wherein R is selected from the group consisting of alkyl radicals containing from 1 to 4, inclusive, carbon atoms, a phenyl radical, and an alkyl-substituted phenyl radical, the total number of carbon atoms in said substituted alkyl groups being in the range of 1 to 6, inclusive, said process comprising the steps of contacting said olefin with a catalyst comprising (a) an organoaluminum compound having the formula $R'_3Al$, wherein R' is selected from the group consisting of alkyl, cycloalkyl, aryl, alkaryl and aralkyl, (b) titanium tetrachloride, (c) an organophosphorus-containing compound corresponding to the formula $R''_3P$, wherein R'' is selected from the group consisting of alkyl, cycloalkyl, aryl, alkaryl and aralkyl and (d) a sodium aryl compound, the ratio of said catalyst components being in the range of 0.2 to 3 mols of (c) to 1 mol of (b) to 0.2 to 3.0 mols of (a) and 1.5 to 4 mols of (d) per mol of (b), in the presence of a hydrocarbon diluent at a temperature in the range of 100 to 500° F. and at a pressure sufficient to maintain said diluent in the liquid phase; and recovering the solid olefin polymer so produced.

7. A process for polymerizing propylene which comprises contacting propylene with a catalyst consisting essentially of (a) triisobutylaluminum, (b) titanium tetrachloride, (c) triphenylphosphine and (d) phenylsodium at a temperature in the range of 150 to 350° F. and at a pressure in the range of 50 to 1500 p.s.i.g.; and recovering the solid polypropylene so produced, the ratio of said catalyst components being in the range of 0.2 to 3 mols of (c) to 1 mol of (b) to 0.2 to 3.0 mols of (a) and 1.5 to 4 mols of (d) per mol of (b).

8. A catalyst composition comprising (a) an organoaluminum compound having the formula $R'_3Al$, wherein R' is selected from the group consisting of alkyl, cycloalkyl, aryl, alkaryl and aralkyl, (b) titanium tetrachloride, (c) an organophosphorus-containing compound corresponding to the formula $R''_3 P$, wherein R'' is selected from the group consisting of alkyl, cycloalkyl, aryl, alkaryl and aralkyl and (d) a sodium aryl compound, the ratio of said catalyst components being in the range of 0.2 to 3 mols of (c) to 1 mol of (b) to 0.2 to 3.0 mols of (a) and 1.5 to 4 mols of (d) per mol of (b).

9. A catalyst composition according to claim 8 consisting essentially of a mixture of triiosobutylaluminum, titanium tetrachloride, triphenylphosphine and phenylsodium.

10. A catalyst composition according to claim 8 consisting essentially of a mixture of triethylaluminum, titanium tetrachloride, triphenylphosphine and phenylsodium.

11. A catalyst composition according to claim 8 consisting essentially of a mixture of triethylaluminum, titanium tetrachloride, trimethylphosphine and naphthylsodium.

References Cited in the file of this patent

UNITED STATES PATENTS

| | | |
|---|---|---|
| 2,832,759 | Nowlin et al. | Apr. 29, 1958 |
| 2,886,561 | Reynolds et al. | May 12, 1959 |
| 2,904,542 | Fasce et al. | Sept. 15, 1959 |

FOREIGN PATENTS

| | | |
|---|---|---|
| 785,314 | Great Britain | Oct. 23, 1957 |